(12) United States Patent
Chen et al.

(10) Patent No.: US 8,094,374 B2
(45) Date of Patent: Jan. 10, 2012

(54) BEAM SHAPING MODULE

(75) Inventors: Chia-Hsu Chen, Kaohsiung (TW);
Yu-Sheng Liu, Tainan County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 820 days.

(21) Appl. No.: 12/050,350

(22) Filed: Mar. 18, 2008

(65) Prior Publication Data
US 2009/0129237 A1    May 21, 2009

(30) Foreign Application Priority Data
Nov. 21, 2007 (TW) .............................. 96144024 A

(51) Int. Cl.
*G02B 27/28* (2006.01)

(52) U.S. Cl. .................. 359/485.06; 372/9; 359/489.08; 359/489.09; 359/629; 359/633

(58) Field of Classification Search .............. 359/485.06
See application file for complete search history.

(56) References Cited

U.S. PATENT DOCUMENTS

| | | | | |
|---|---|---|---|---|
| 4,110,004 A | * | 8/1978 | Bocker | ...................... 359/487.02 |
| 4,170,401 A | * | 10/1979 | Yoder et al. | ............... 359/485.06 |
| 4,793,694 A | | 12/1988 | Liu | |

FOREIGN PATENT DOCUMENTS

| TW | 465151 | 11/2001 |
|---|---|---|
| TW | I236543 | 7/2005 |
| TW | 200525181 | 8/2005 |

OTHER PUBLICATIONS

K Jasper et al., "Excimer laser beam homogenizer with low divergence", 1999, Applied Physics Association.
Taiwan Intellectual Property Office, "Office Action", Jun. 30, 2011, Taiwan.

* cited by examiner

*Primary Examiner* — Lee Fineman
(74) *Attorney, Agent, or Firm* — WPAT, PC; Justin King

(57) ABSTRACT

A beam shaping module capable of receiving a polarized beam from a light source is disclosed including a beam splitter for splitting the polarized beam into a first beam and a second beam wherein the polarization directions of the first beam and the second beam are perpendicular to each other, and a beam combiner for shaping and combining the first beam and the second beam, where the beam combiner is configured to reverse the energy distribution pattern of one of the first beam and the second beam.

11 Claims, 6 Drawing Sheets

BEAM SHAPING MODULE

BACKGROUND OF THE INVENTION

1. Field of the Invention

The present invention generally relates to a beam shaping module and, more particularly, to a beam shaping module capable of reversing the energy distribution pattern of one of a first beam and a second beam split by a beam splitter and capable of shaping and combining the first beam and the second beam.

2. Description of the Prior Art

Laser beam shaping has attracted lots of attention in industries, medical applications and academic researches. For example, laser beam shaping is widely used in applications, where the intensity distribution of laser is precisely controlled, such as photolithography in semiconductor processing, micro-circuit repair, micro-machining, cutting, welding, material growth, optical data storage, plastic surgery, nuclear fusion, etc.

Generally, the intensity distribution of a single-mode laser is spatially Gaussian. However, the intensity distributions of some multi-mode lasers are very complicated. In some applications, it is required that the intensity distribution of lasers is uniform with sharp corners, which leads to advancement in laser beam shaping.

The currently used methods in laser beam shaping use optical components such as lenses, diffraction elements, lens arrays, light pipes and combination thereof. Lenses and diffraction elements are only suitable for single-mode lasers. For multi-mode lasers, lens arrays or light pipes are required. There are advantages and disadvantages. For example, the non-spherical lenses for lens shaping are complicated in manufacturing and costly. The optical paths are precisely aligned; otherwise the laser intensity distribution will be changed. Issues in alignment appear for diffraction elements. Advanced diffraction elements are required to improve the efficiency, which leads to manufacture complexity and cost. When a single-mode light source is used with lens array, interference and diffraction sometimes happen to cause non-uniformity. If a light pipe is used, the transmission is reduced because the length and multi-reflections make downsizing and improvement in transmission harder.

In U.S. Pat. No. 4,793,694, two reflectors are used to split an incident light beam into three beams. Then, another two reflectors are used to make these three beams overlap on one plane to uniformize the irradiancy. In this embodiment, the reflectors have to be fine tuned to specific angles with additional wave plates to adjust the coherence of these three beams and prevent interference fringes from making the uniformity worse. In another embodiment of this disclosure, a single prism is used to split an incident light beam into three beams and make these three beams overlap on one plane to uniformize the irradiancy. However, no wave plates can be used to adjust the coherence of these three beams and prevent interference fringes from making the uniformity worse.

Therefore, there is need in providing a beam shaping module with an attempt to overcome the foregoing drawbacks.

SUMMARY OF THE INVENTION

It is one object of the present invention to provide a beam shaping module capable of reversing the energy distribution pattern of one of a first beam and a second beam split by a beam splitter and capable of shaping and combining the first beam and the second beam.

In order to achieve the foregoing object, the present invention provides beam shaping module receiving a polarized beam from a light source, the beam shaping module comprising:

a beam splitter, capable of splitting the polarized beam into a first beam and a second beam, wherein polarization directions of the first beam and the second beam are perpendicular to each other; and a beam combiner, capable of shaping and combining the first beam and the second beam;

wherein the beam combiner is capable of reversing the energy distribution pattern of one of the first beam and the second beam.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

Figure 1:
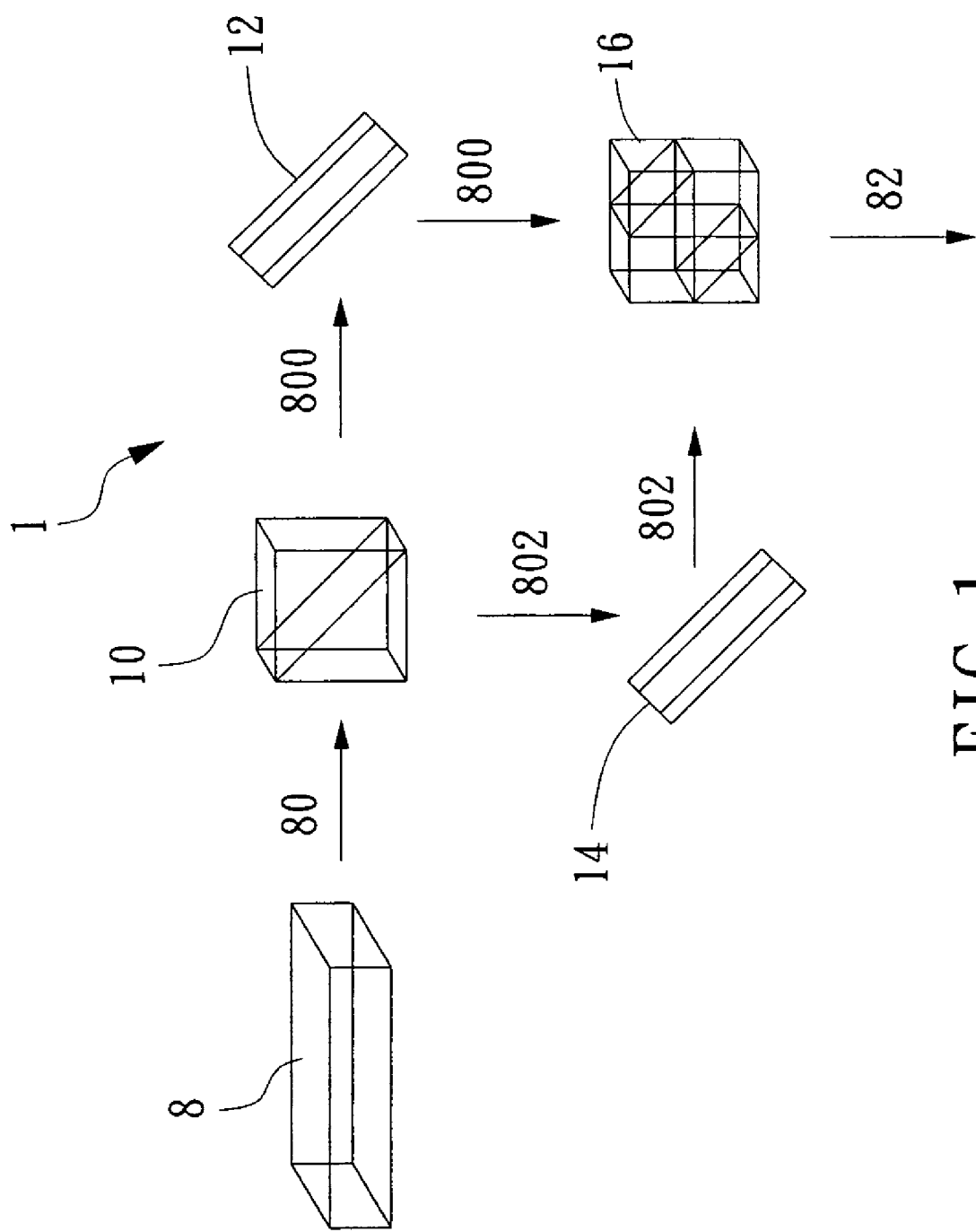
FIG. 1 is a schematic diagram showing a beam shaping module according to the present invention.

Please refer to FIG. 1, which is a schematic diagram showing a beam shaping module according to the present invention. In FIG. 1, the beam shaping module 1 comprises a polarized beam splitter 10, a reflector 12, a reflector 14 and a beam combiner 16.

First, the light source 8 generates a coherent radially polarized beam 80 incident on the polarized beam splitter 10. The polarized beam splitter 10 allows a polarized beam 800 with a specific polarization direction to pass through. Another beam 802 with another polarization direction perpendicular to the polarization direction of the polarized beam 800 is deviated to another direction. Therefore, the polarized beam splitter 10 is capable of splitting the beam 80 into the beam 800 and the beam 802 while enabling the polarization directions of the beam 800 and the beam 802 to be perpendicular to each other. In FIG. 1, the beam 800 and the beam 802 are reflected by the reflector 12 and the reflector 14 disposed in parallel to enter the beam combiner 16. The beam combiner 16 is configured to reverse the energy distribution pattern of the beam 800 (or the beam 802) and then combining the reversed beam 800 (or the beam 802) and the beam 802 (or the beam 800) to output a beam 82.

Figure 2:
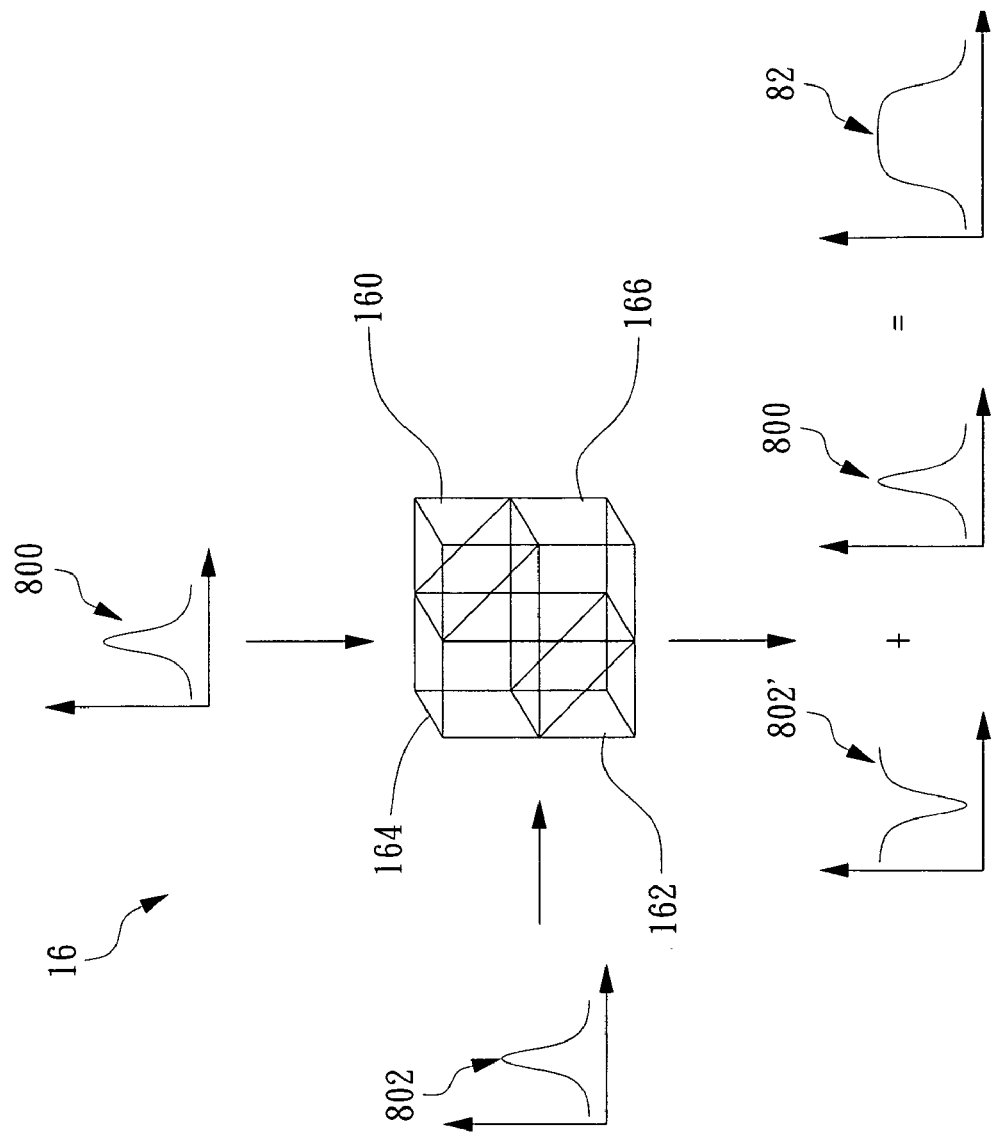
FIG. 2 is a schematic diagram showing the incident beam transformed and combined by a beam shaping module of the present invention.

Please refer to FIG. 2, which is a schematic diagram showing the incident beam transformed and combined by a beam combiner 16 of the present invention. In FIG. 2, the beam combiner 16 is composed of four cubic glasses, two of which are polarized-beam-splitting cubic glasses 160 and 162 and another two are general optical cubic glasses 164 and 166. These four cubic glasses are capable of preventing the beams from being deviated. The beam combiner 16 is formed of the polarized-beam-splitting cubic glasses 160 and 162 disposed diagonally and the optical cubic glasses 164 and 166 disposed diagonally. The function of the two polarized-beam-splitting cubic glass 160 and 162 is similar to the polarized beam splitter 10.

In FIG. 2, the beam 802 is deviated by the polarized-beam-splitting cubic glasses 160 and 162 to become a reversed beam 802'. The beam 800 passes through the beam combiner 16, and therefore the peak and valley of the intensity distribution of the reversed beam 802' can be summed with the peak and valley of the intensity distribution of the beam 800 so as to form a flat top beam 82.

Figure 3:
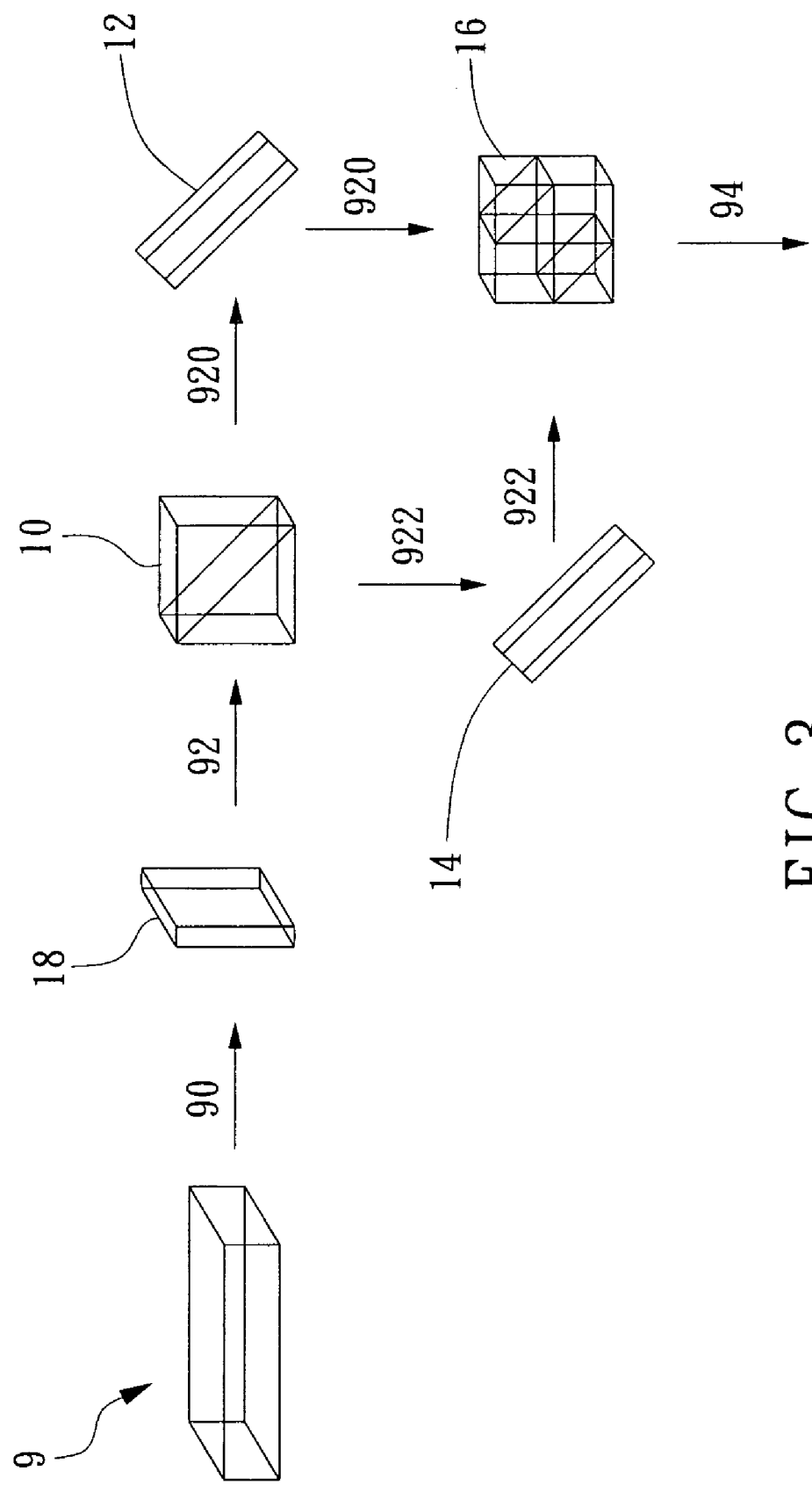
FIG. 3 is a schematic diagram showing a beam shaping module according to another embodiment of the present invention.

In order to achieve beam shaping, the present invention further provides another embodiment as shown in FIG. 3. In FIG. 3, the elements are similar to those in FIG. 1 except that the coherent linearly polarized beam 90 generated from the light source 9 in FIG. 3 first passes through a quarter wave plate 18 and becomes a radially polarized beam 92.

The polarized beam splitter 10 is capable of allowing the beam 920 with a specific polarization direction to pass through. The beam 922 with a polarization direction perpendicular to the specific polarization direction of the beam 920 is deviated to another direction. Thereby, the polarized beam splitter 10 splits the beam 92 into the beam 920 and the beam 922 with different polarization directions that are perpendicular to each other.

In FIG. 3, the beam 920 and the beam 922 are reflected by the reflector 12 and the reflector 14, respectively, to enter the beam combiner 16. The beam combiner 16 reverses the energy distribution pattern of the beam 920 (or the beam 922) and then combining the reversed beam 920 (or the beam 922) and the beam 922 (or the beam 920) to output a beam 94.

Figure 4:
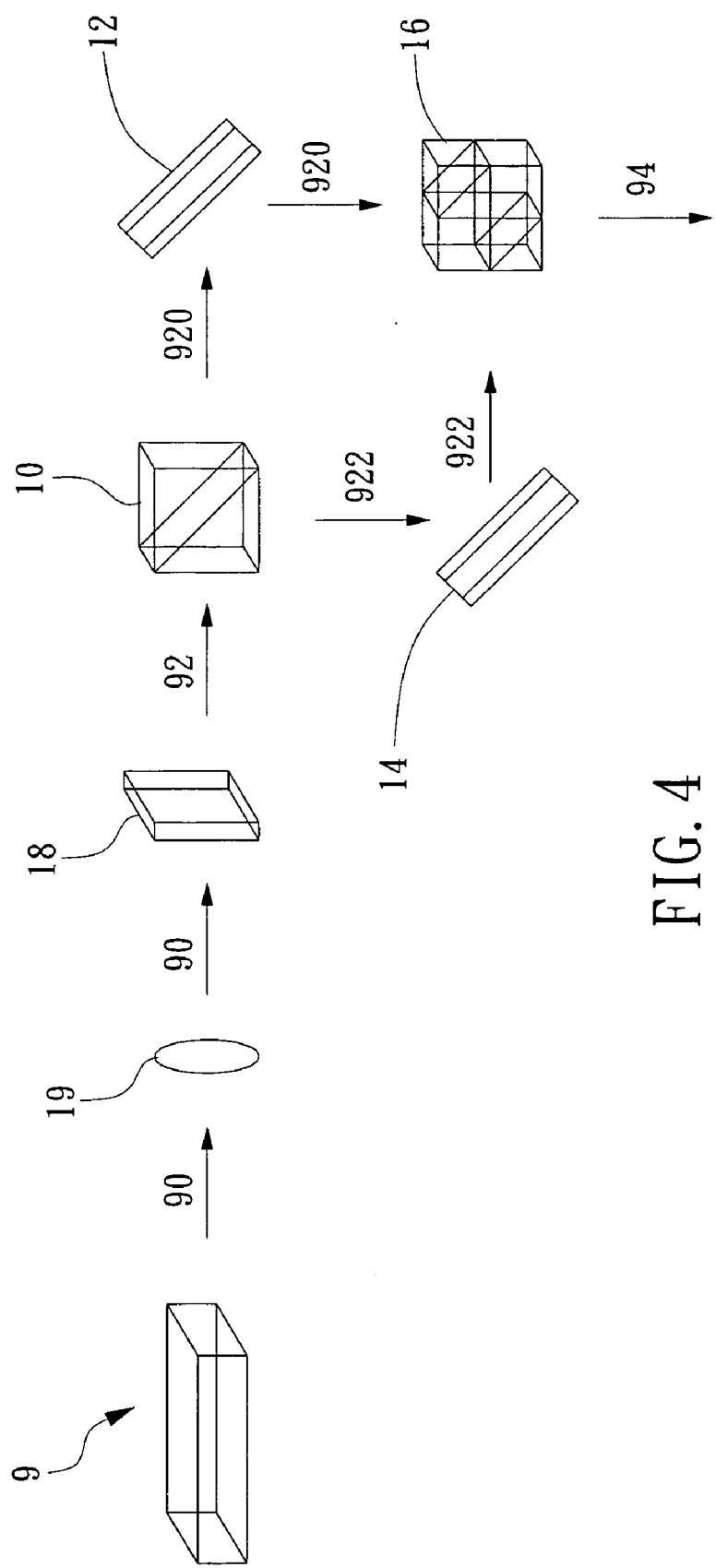
FIG. 4 is a schematic diagram showing a beam shaping module according to another embodiment of the present invention.

Furthermore, in order to achieve beam shaping, the present invention further provides another embodiment as shown in FIG. 4. In FIG. 4, the elements are similar to those in FIG. 3 except that a beam expander 19 is further disposed between the light source 9 and the quarter wave plate 18, which is capable of expanding the light spot. After the light source 9 generates the coherent linearly polarized beam 90, the coherent linearly polarized beam 90 first passes through the beam expander 19 so that the coherent linearly polarized beam 90 is expanded, and then the coherent linearly polarized beam 90 passes through a quarter wave plate 18 so that the coherent linearly polarized beam 90 becomes a radially polarized beam 92. The energy transformation of the beam is similar to that in the embodiment in FIG. 3, and therefore the description thereof is not repeated.

Figure 5:
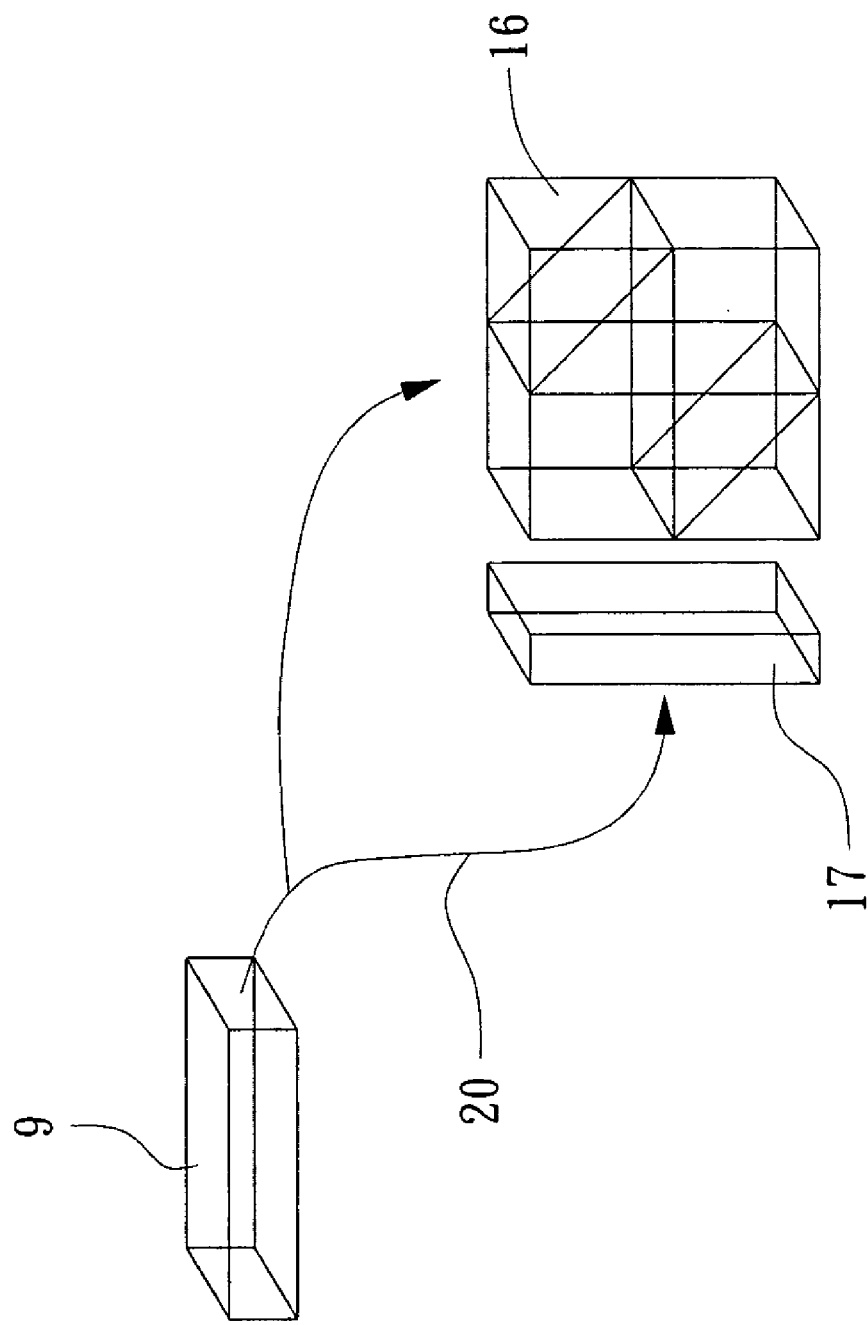
FIG. 5 is a schematic diagram showing a beam shaping module according to another embodiment of the present invention.

In order to achieve beam shaping, the present invention further provides another embodiment as shown in FIG. 5. In FIG. 5, a light beam from the light source 9 is divided into two beams by a fiber 20. These two beams are introduced into the beam combiner 16 from the top and the left side, respectively. If the polarization of the beams output from the fiber 20 remains unchanged, a polarization transformation device (or a filtering device) 17 can be used to transform the polarization of one of the two beams so that the polarization directions of the two beams are perpendicular. The energy transformation of the beam is similar to that in the embodiment in FIG. 3, and therefore the description thereof is not repeated.

Figure 6:
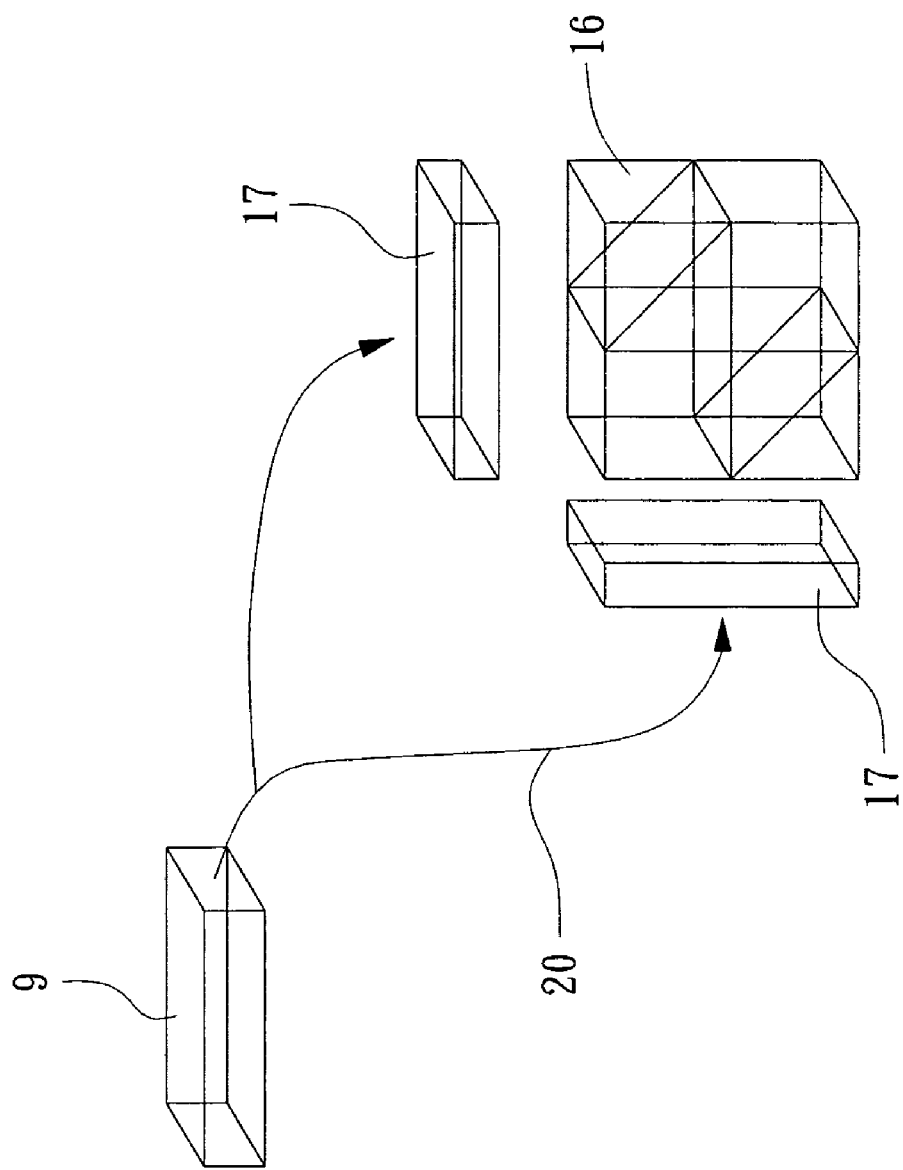
FIG. 6 is a schematic diagram showing a beam shaping module according to another embodiment of the present invention.

In order to achieve beam shaping, the present invention further provides another embodiment as shown in FIG. 6. In FIG. 6, a light beam from the light source 9 is divided into two beams by a fiber 20. These two beams are introduced into the beam combiner 16 from the top and the left side, respectively. If the beams output from the fiber 20 are not polarized, a polarization transformation device (or a filtering device) 17 can be used to polarize the beams so that the polarization directions of the two beams are perpendicular. The energy transformation of the beam is similar to that in the embodiment in FIG. 3, and therefore the description thereof is not repeated.

In the present invention, a light source with coherence (for example, a laser light source) is used. Alternatively, a light source with radial polarization or linear polarization can also be used. Moreover, the polarized beam splitter is implemented by a prism or a lens.

Since the beam shaping module of the present invention uses a polarized beam combiner, high-precision machining is thus not required. Moreover, the beam shaping module of the present invention is free of interference because the beam is generated by combining two beams with perpendicular polarization directions. The output of the beam shaping module of the present invention is a parallel light beam with flexibility in shaping adjustment. Moreover, the elements used in the present invention are mostly cubic and compatible with polarization plates, and thus the beam shaping module can be easy assembled. Furthermore, the present invention achieves flat-top beam shaping with a simplified apparatus.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A beam shaping module receiving a polarized beam from a light source, the beam shaping module comprising:
    a beam splitter, which is a polarized beam splitter capable of splitting the polarized beam into a first beam and a second beam, wherein polarization directions of the first beam and the second beam are perpendicular to each other, and said beam splitter is capable of introducing the first beam and the second beam to a reflecting unit comprising a first reflector and a second reflector to reflect the first beam and second beam to a beam combiner, and the first reflector and the second reflector are disposed in parallel; and
    a beam combiner, the beam combiner comprises four cubic glasses, two of which are polarized-beam-splitting cubic glasses disposed diagonally and another two are general optical cubic glasses disposed diagonally, said four cubic glasses are capable of preventing the beams from being deviated, and said two polarized-beam-splitting cubic glass function the same as the polarized beam splitter does, said beam combiner is capable of shaping and combining the first beam and the second beam and reversing the energy distribution pattern of one of the first beam and the second beam.

2. The beam shaping module as recited in claim 1, wherein the beam splitter is a fiber capable of introducing the first beam and the second beam to the beam combiner.

3. The beam shaping module as recited in claim 2, wherein the beam splitter further comprises at least a polarization transformation device capable of transforming the polarization directions of the first beam and the second beam to be perpendicular to each other.

4. The beam shaping module as recited in claim 2, wherein the beam splitter further comprises at least a polarization filtering device capable of filtering the first beam and the second beam so that the polarization directions are perpendicular to each other.

5. The beam shaping module as recited in claim 1, wherein the light source is a laser light source.

6. The beam shaping module as recited in claim 5, further comprising a polarization transformation unit capable of transforming the polarized beam from linear polarization to radial polarization.

7. The beam shaping module as recited in claim 6, wherein the polarization transformation unit is a quarter wave plate.

8. The beam shaping module as recited in claim 5, further comprising a beam expander disposed between the light source and the polarized beam splitter to expand the polarized beam.

9. The beam shaping module as recited in claim 1, wherein the light source is a coherent light source.

10. The beam shaping module as recited in claim 1, wherein the light source is a radially polarized or linear polarized light source.

11. The beam shaping module as recited in claim 1, wherein the beam splitter is one of a prism and a lens.

* * * * *